United States Patent
Liao

(10) Patent No.: US 9,566,757 B2
(45) Date of Patent: Feb. 14, 2017

(54) CONTINUOUS SEALING DEVICE AND STORING AND FEEDING TABLE THEREOF

(71) Applicants: AIR-BAG PACKING CO., LTD., New Taipei (TW); Tai-An Liao, New Taipei (TW)

(72) Inventor: Tai-An Liao, New Taipei (TW)

(73) Assignees: Air-Bag Packaging Co., Ltd., New Taipei (TW); Tai-An Liao, New Taipei (TW)

( * ) Notice: Subject to any disclaimer, the term of this patent is extended or adjusted under 35 U.S.C. 154(b) by 840 days.

(21) Appl. No.: 13/889,939

(22) Filed: May 8, 2013

(65) Prior Publication Data

US 2014/0047796 A1 Feb. 20, 2014

(30) Foreign Application Priority Data

Aug. 15, 2012 (TW) .............................. 101129564 A

(51) Int. Cl.
*B31D 5/00* (2006.01)
*B65B 51/16* (2006.01)
(Continued)

(52) U.S. Cl.
CPC ........... *B31D 5/0073* (2013.01); *B29C 65/223* (2013.01); *B29C 66/1122* (2013.01);
(Continued)

(58) Field of Classification Search
CPC ....... B31D 5/0073; B65B 51/16; B65B 51/26; B65B 43/02; B65B 43/123; B32B 37/0053; B29C 65/223; B29C 66/221; B29C 66/223; B29C 66/3452; B29C 66/439; B29C 66/81465; B29C 66/83411; B29C 66/83511; B29L 2022/02; B29L 2031/7138
(Continued)

(56) References Cited

U.S. PATENT DOCUMENTS 3,667,593 A * 6/1972 Pendleton ............... B29C 65/18
206/522
3,703,430 A * 11/1972 Rich ....................... B29C 65/18
156/497

(Continued)

FOREIGN PATENT DOCUMENTS

JP 43-008556 4/1943
JP 43008556 Y1 * 4/1968 ............. B65B 51/26
(Continued)

*Primary Examiner* — Stephen F Gerrity
(74) *Attorney, Agent, or Firm* — Muncy, Geissler, Olds & Lowe, P.C.

(57) ABSTRACT

A continuous sealing device includes: a first roller, having a first circumference, where the first circumference includes a first heat sealing segment; a first heating member, located at the first heat sealing segment, where when the first roller rotates, the first heating member bonds film sheets in a heat sealing manner to form a first bonding segment; a second roller, having a second circumference, the second circumference includes a second heat sealing segment; and a second heating member, located at the second heat sealing segment, where when the second roller rotates, the second heating member bonds the film sheets in a heat sealing manner to form a second bonding segment, and the first bonding segment and the second bonding segment are connected to form an uninterrupted heat sealing wire on the film sheets.

10 Claims, 19 Drawing Sheets

(51) Int. Cl.
  *B29C 65/00* (2006.01)
  *B29C 65/22* (2006.01)
  *B32B 37/00* (2006.01)
  *B65B 43/02* (2006.01)
  *B65B 43/12* (2006.01)
  *B29L 31/00* (2006.01)
  *B29L 22/02* (2006.01)

(52) U.S. Cl.
  CPC .......... *B29C 66/221* (2013.01); *B29C 66/223* (2013.01); *B29C 66/3452* (2013.01); *B29C 66/439* (2013.01); *B29C 66/81465* (2013.01); *B29C 66/83411* (2013.01); *B29C 66/83511* (2013.01); *B65B 51/16* (2013.01); *B29L 2022/02* (2013.01); *B29L 2031/7138* (2013.01); *B32B 37/0053* (2013.01); *B65B 43/02* (2013.01); *B65B 43/123* (2013.01)

(58) Field of Classification Search
  USPC  53/79, 374.4, 389.4; 156/555, 582; 219/470
  See application file for complete search history.

(56) References Cited

U.S. PATENT DOCUMENTS

| | | | |
|---|---|---|---|
| 3,708,377 A | | 1/1973 | Finke et al. |
| 3,735,551 A | | 5/1973 | Pratt |
| 3,933,568 A | * | 1/1976 | Schmermund ...... B29C 65/5042 156/512 |
| 4,085,560 A | * | 4/1978 | McClosky .......... B29C 65/7894 156/290 |
| 5,183,527 A | * | 2/1993 | Parker .................... B43M 5/047 156/555 |
| 5,234,531 A | * | 8/1993 | Ballestrazzi et al. ... B29C 65/18 156/359 |
| 5,357,731 A | * | 10/1994 | Conway et al. ......... B65B 51/26 493/208 |
| 5,376,219 A | * | 12/1994 | Sperry et al. ......... B29C 44/182 100/328 |
| 5,527,416 A | * | 6/1996 | Traise .................. B29C 66/3452 156/290 |
| 5,573,627 A | * | 11/1996 | Vuong ..................... B65B 27/10 156/392 |
| 2002/0148569 A1 | * | 10/2002 | Stork ....................... B29C 65/18 156/555 |
| 2004/0045261 A1 | * | 3/2004 | Sperry et al. ........... B65B 9/026 53/436 |
| 2005/0258301 A1 | * | 11/2005 | Hirte et al. ........... B65H 75/242 242/597.6 |
| 2006/0042184 A1 | * | 3/2006 | Perkins et al. ........ B31D 5/0073 53/79 |
| 2006/0218880 A1 | * | 10/2006 | Sperry et al. ......... B29C 65/229 53/403 |
| 2008/0250753 A1 | * | 10/2008 | Sperry et al. ......... B29C 65/226 53/79 |
| 2010/0200169 A1 | | 8/2010 | Sperry et al. |
| 2011/0024055 A1 | * | 2/2011 | Chiang ................. B29C 65/222 156/497 |

FOREIGN PATENT DOCUMENTS

| | | | |
|---|---|---|---|
| JP | 1973-020741 | 6/1973 | |
| JP | 2004505862 A | 2/2004 | |
| JP | 2008537706 A | 9/2008 | |
| WO | WO 9301978 A1 * | 2/1993 | ............ B29C 66/80 |

\* cited by examiner

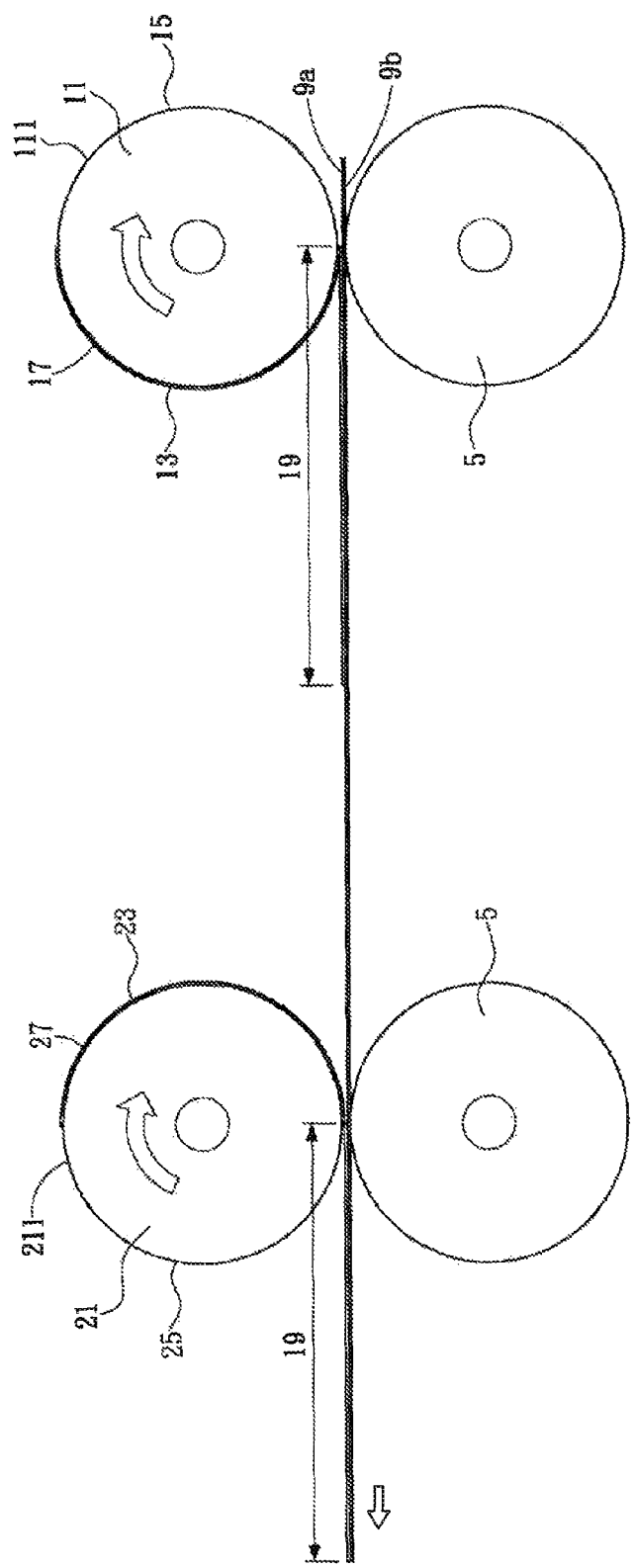

CONTINUOUS SEALING DEVICE AND STORING AND FEEDING TABLE THEREOF

CROSS-REFERENCES TO RELATED APPLICATIONS

This non-provisional application claims priority under 35 U.S.C. §119(a) on Patent Application No. 101129564 filed in Taiwan, R.O.C. on Aug. 15, 2012, the entire contents of which are hereby incorporated by reference.

BACKGROUND OF THE INVENTION

Technical Field

The present invention relates to a sealing device, and particularly to a continuous sealing device for forming an uninterrupted heat sealed seam and a storing and feeding table thereof.

Related Art

Accordingly, to prevent damage caused by collision or extrusion among articles in a transportation process, the articles are covered by a buffer airbag having air bubble particles, where the buffer airbag is injected with air before a plurality of film sheets is sealed, and then is subjected to heat sealing, so air columns are formed. Through the space and the air pressure generated by packing the buffer airbag between a box and the articles, the collision impact strength on the articles is reduced, so as to reduce the injury or damage to the minimum extent.

As shown in FIG. 1, a conventional buffer airbag A1 is generally formed by heating and performing heat sealing on two plastic film sheets A10 by an electrically heated wire A21 on a roller A2, and the heating roller A2 forms discontinuously connected (namely, interrupted type), heat sealing wires A3 on a plastic film sheet A10 by using the electrically heated wire A21 surrounding the outer edge, so that a disconnected gap B exists between the heat sealing wires A3. Since the heat sealing wires A3 cannot be connected between each other, the air leakage problem occurs in inflated air columns.

SUMMARY

In view of this, the present invention proposes a continuous sealing device, including: a first roller, having a first circumference, where the first circumference includes a first heat sealing segment and a first non-heat sealing segment; a first heating member, located at the first heat sealing segment, where when the first roller rotates, the first heating member bonds a plurality of film sheets in a heat sealing manner to form a first bonding segment; a second roller, having a second circumference, where the second circumference and the first circumference have an equal length, the second circumference includes a second heat sealing segment and a second non-heat sealing segment, and the length of the first heat sealing segment and the second heat sealing segment is greater than or equal to the first circumference; and a second heating member, located at the second heat sealing segment, where when the second roller rotates, the second heating member bonds the plurality of film sheets in a heat sealing manner to form a second bonding segment, and the first bonding segment and the second bonding segment are connected to form an uninterrupted heat sealed seam on the plurality of film sheets.

The present invention also proposes a storing and feeding table, including the aforementioned continuous sealing device and an inflating module, where the inflating module inflates the plurality of film sheets to form an air column and blows air toward an air storage chamber of the air column.

In the present invention, the first roller and the second roller rotate to perform heat sealing on the plurality of film sheets, so that the first heating member of the first roller bonds the film sheets in a heat sealing manner to form the first bonding segment, and the second heating member of the second roller bonds the film sheets in a heat sealing manner to form the second bonding segment; therefore, the first bonding segment and the second bonding segment are connected to form an uninterrupted sealed seam wire on the plurality of film sheets, so as to effectively solve the problem in the prior art that a plurality of heat sealed seams on a plurality of film sheets cannot be connected and discontinue, thereby causing leakage of inflation air in the air column.

The detailed features and advantages of the present invention are described below in great detail through the following embodiments, the content of the detailed description is sufficient for those skilled in the art to understand the technical content of the present invention and to implement the present invention there accordingly. Based upon the content of the specification, the claims, and the drawings, those skilled in the art can easily understand the relevant objectives and advantages of the present invention.

BRIEF DESCRIPTION OF THE DRAWINGS

The present invention will become more fully understood from the detailed description given herein below for illustration only, and thus not limitative of the present invention, and where:

FIG. 4B is a schematic front view (2) after heat sealing of the first embodiment of the present invention;

DETAILED DESCRIPTION

Figure 1:
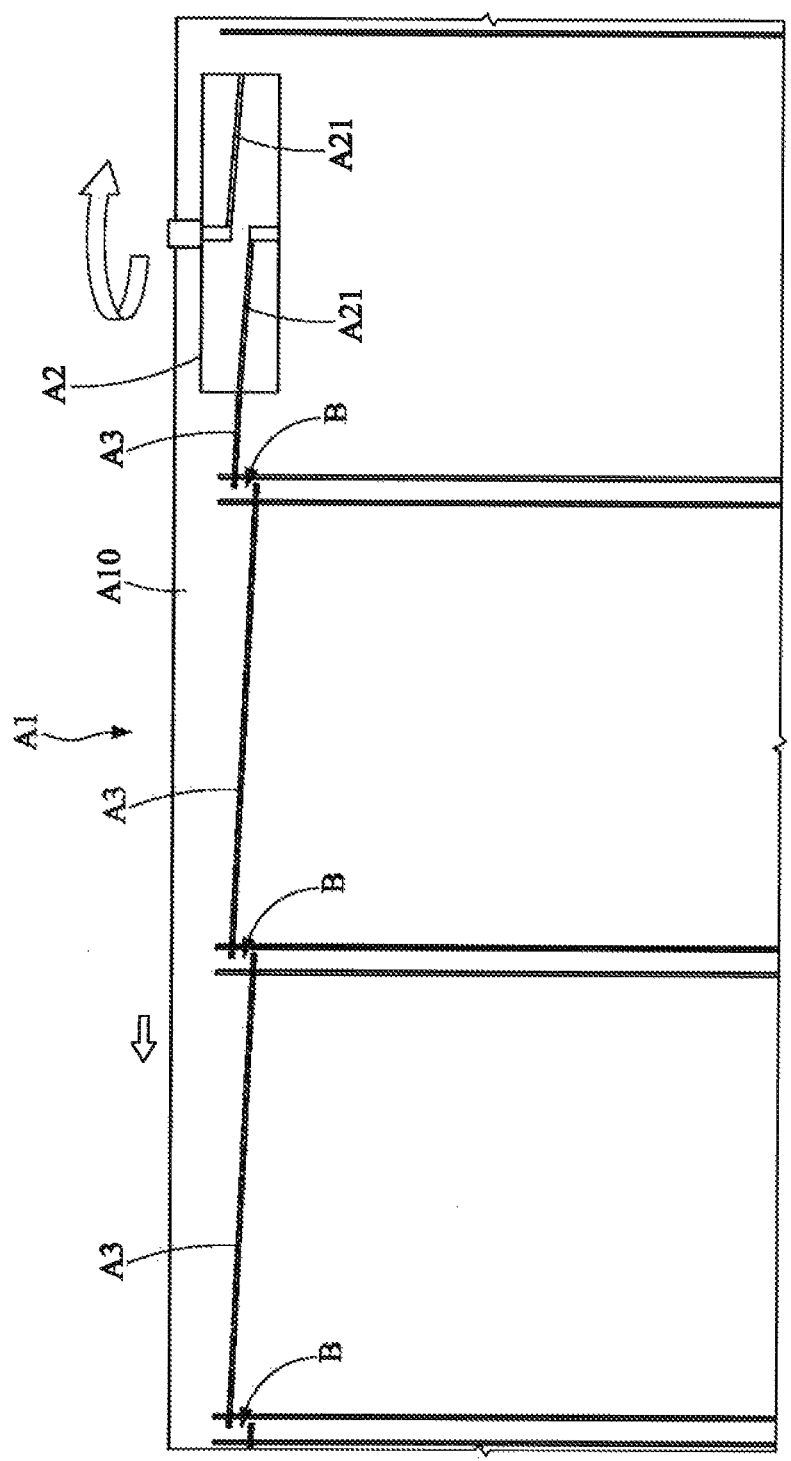
FIG. 1 is a schematic top view of a conventional technology.
Figure 2A:
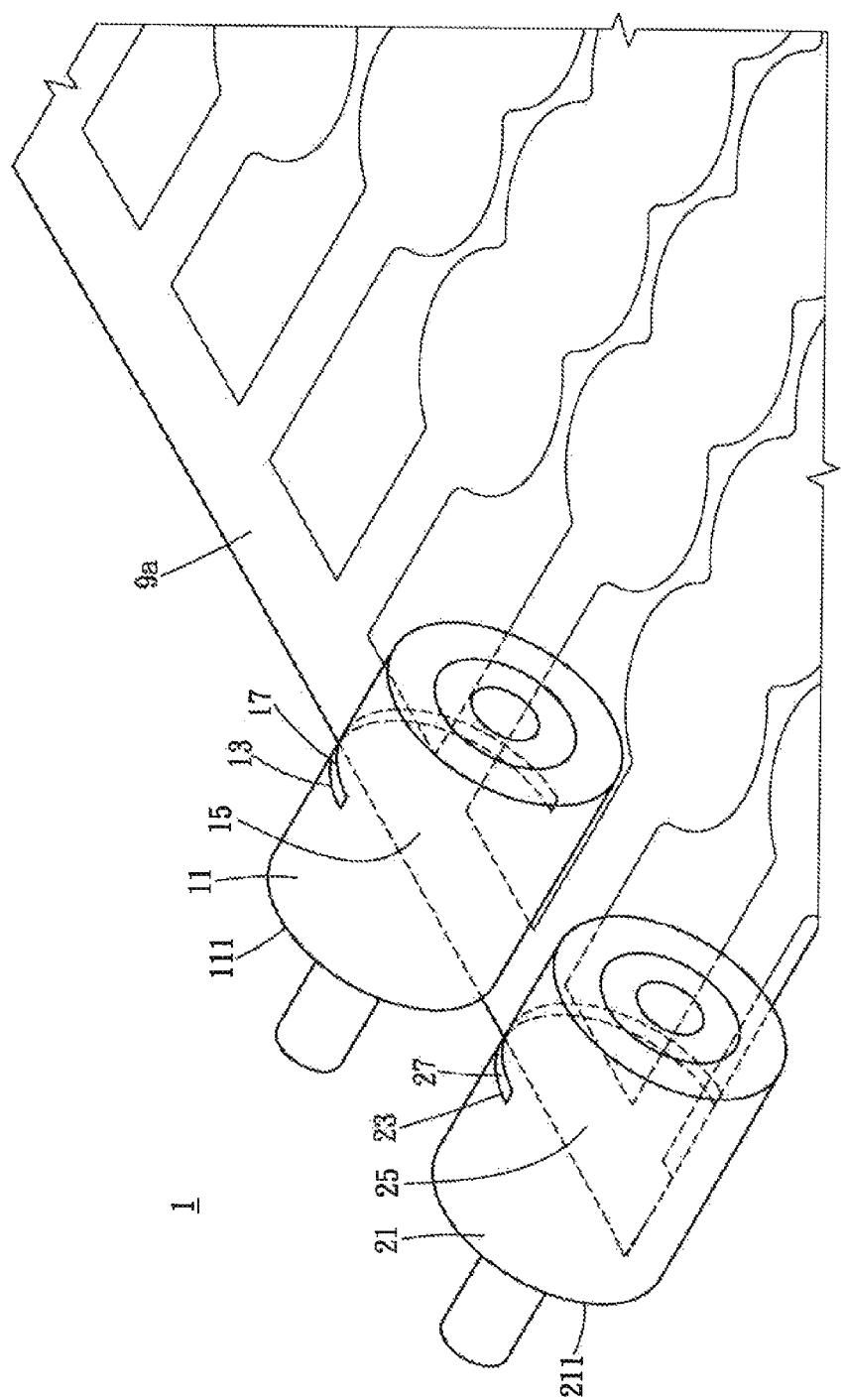
FIG. 2A is a three-dimensional external view (1) of a first embodiment of the present invention.
Figure 2B:
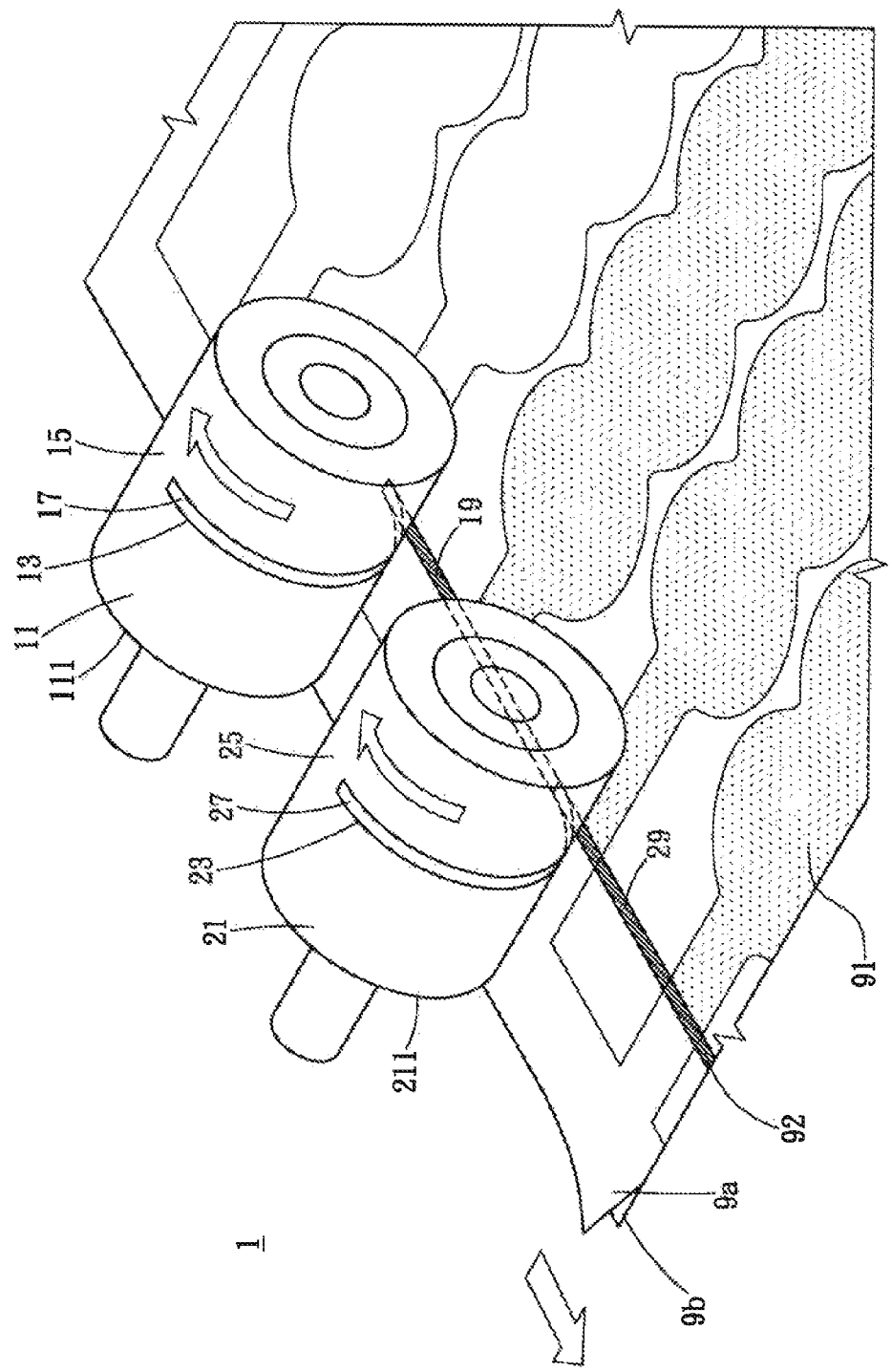
FIG. 2B is a three-dimensional external view (2) of the first embodiment of the present invention.
Figure 2C:
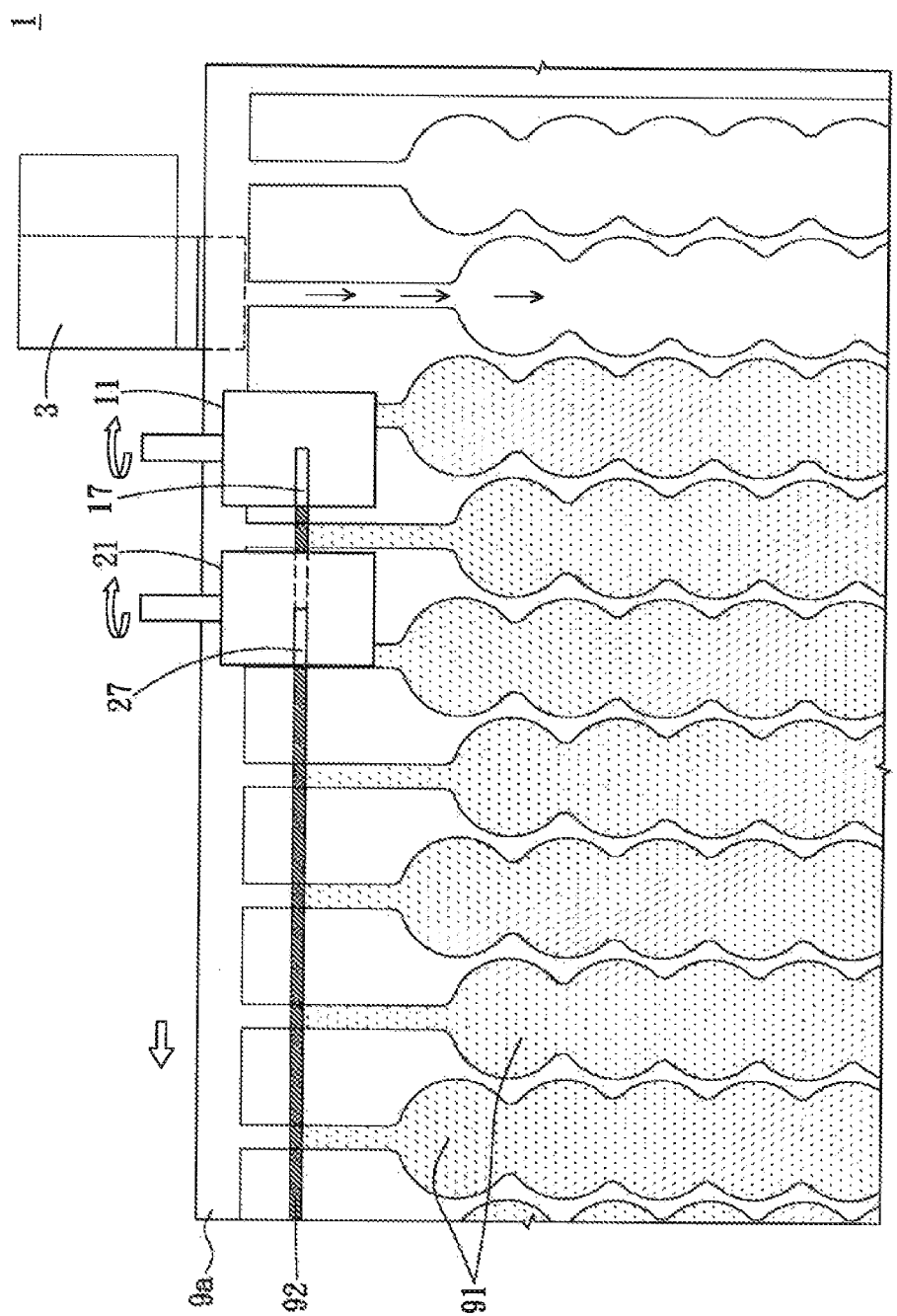
FIG. 2C is a schematic top view of the first embodiment of the present invention.

Please refer to FIG. 2A, FIG. 2B, and FIG. 2C, in which a continuous sealing device 1 disclosed in a first embodiment of the present invention is shown.

The continuous sealing device 1 of the present invention includes: a first roller 11, at least one first heating member 17, a second roller 21, and at least one second heating member 27.

Figure 3A:
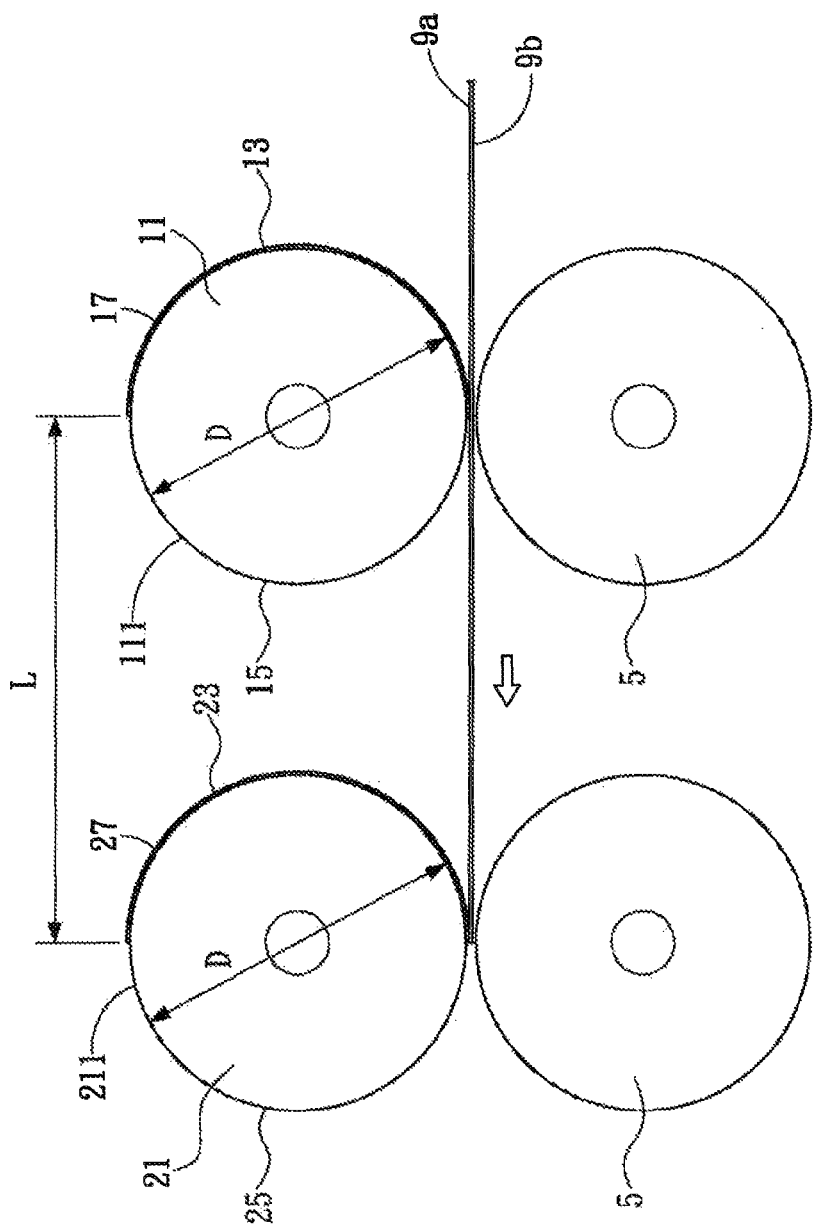
FIG. 3A is a schematic front view (1) before heat sealing of the first embodiment of the present invention.

Please refer to FIG. 3A, in which an outer ring of the first roller 11 has a first circumference 111, and the first circumference 111 includes a first heat sealing segment 13 and a first non-heat sealing segment 15. In this embodiment, a first heat sealing segment 13 and a first non-heat sealing segment 15 are disposed on the first circumference 111, where, the cross section of the first heat sealing segment 13 is formed into a semi-circular arc shape, located at one half of the first circumference 111, the cross section of the first non-heat sealing segment 15 is formed into a semi-circular arc shape, located at the other half of the first circumference 111, and the first heat sealing segment 13 and the first non-heat sealing segment 15 are arranged in a staggered manner (namely, the first heat sealing segment 13 is followed by the first non-heat sealing segment 15, and the first heat sealing segment 13 and the first non-heat sealing segment 15 are alternately arranged).

Figure 5:
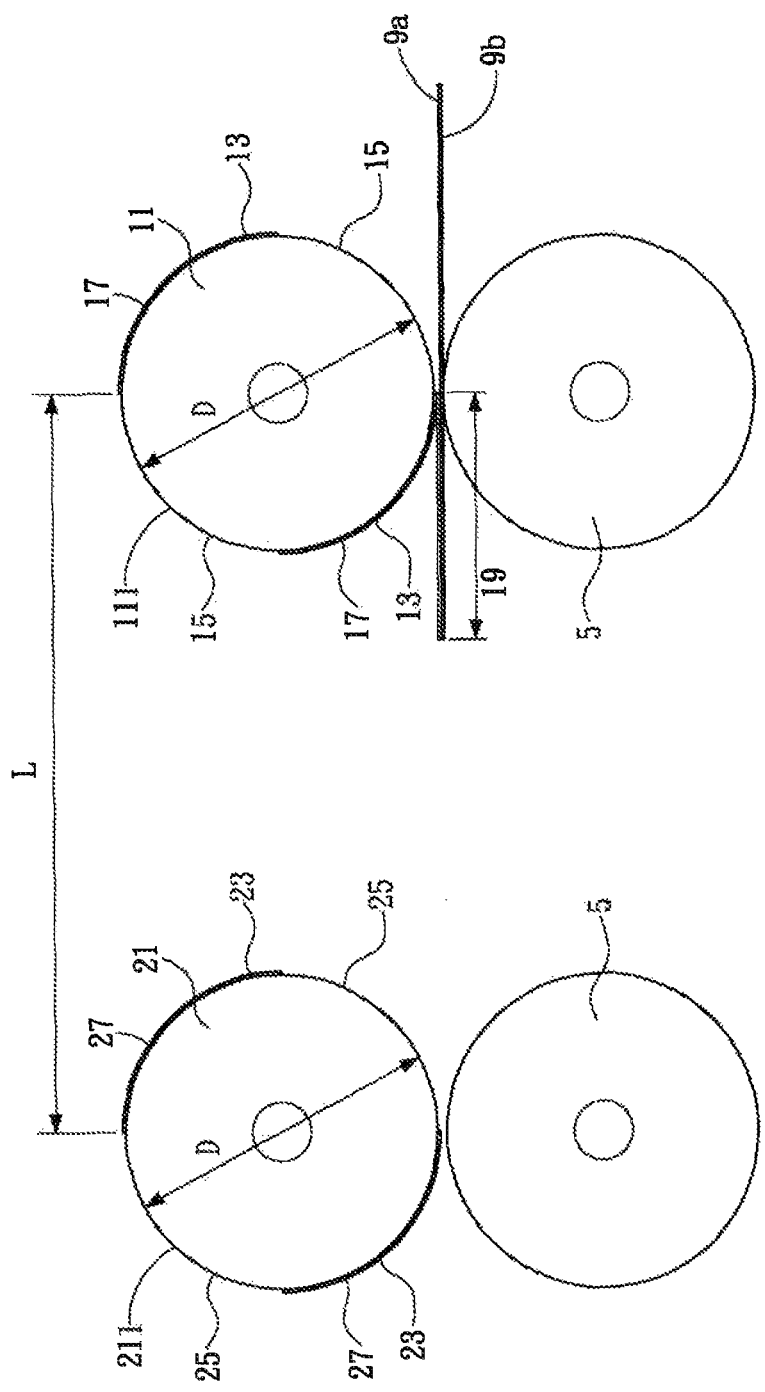
FIG. 5 is a schematic front view (1) of a plurality of heating members of the first embodiment of the present invention.
Figure 6:
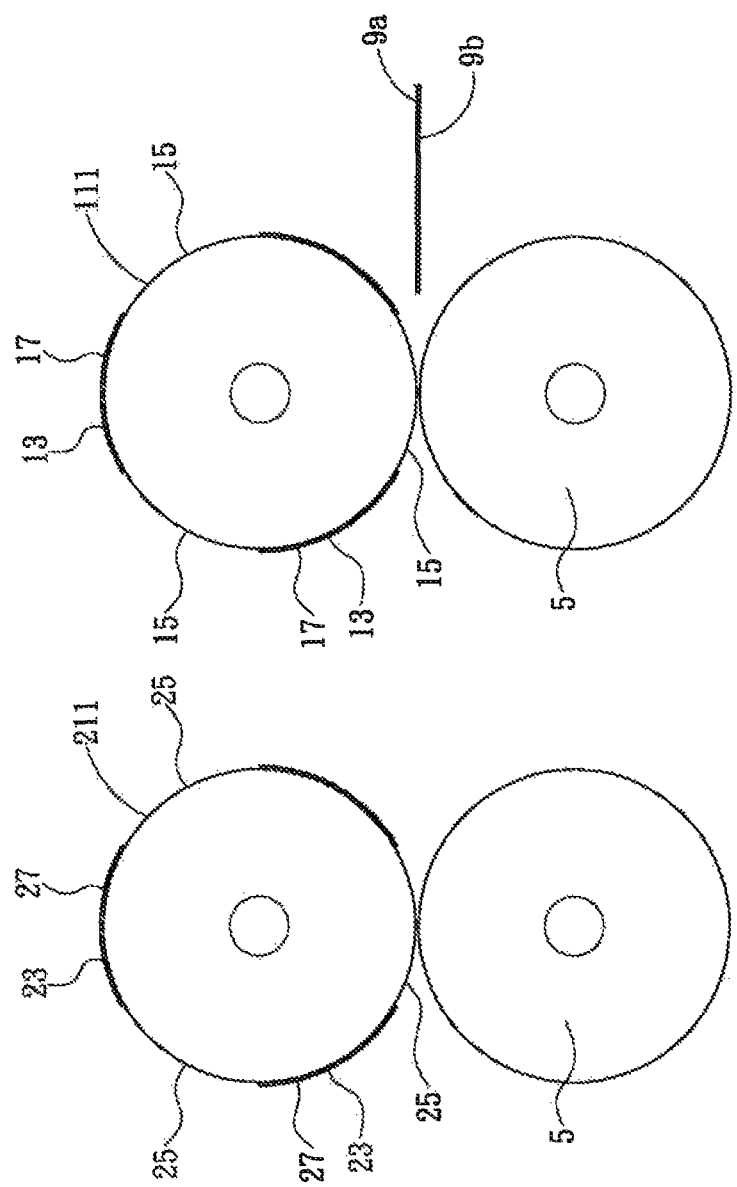
FIG. 6 is a schematic front view (2) of a plurality of heating members of the first embodiment of the present invention.

The length of and the number of the first heat sealing segment 13 and the first non-heat sealing segment 15 illustrated above are only exemplary, and the present invention is not limited thereto. In some embodiments, the length of the first heat sealing segment 13 and the length of the first non-heat sealing segment 15 may be the same (as shown in FIG. 3A), and, in some embodiments, two first heat sealing segments 13 and two first non-heat sealing segments 15 may be separately disposed on the first roller 11 (as shown in FIG. 5). The two first heat sealing segments 13 and the two first non-heat sealing segments 15 are alternately located on the first roller 11, and the following advantages are provided: (1) to reduce a gap between the first roller 11 without sealing and the second roller 21 before sealing when heat sealing is performed on a plurality of film sheets 9a and 9b; and (2) to prevent a heat sealed seam 92 from being disconnected in a staggered manner because the plurality of film sheets 9a and 9b offsets up and down (such as, the head and the tail of the heat sealed seam 92 are not connected). Furthermore, in some embodiments, three first heat sealing segments 13 and three first non-heat sealing segments 15 may be separately disposed on the first roller 11 (as shown in FIG. 6), and the three first heat sealing segments 13 and the three first non-heat sealing segments 15 are arranged on the first roller 11 in a staggered manner, and are each located on one sixth of the outer edge.

Figure 3B:
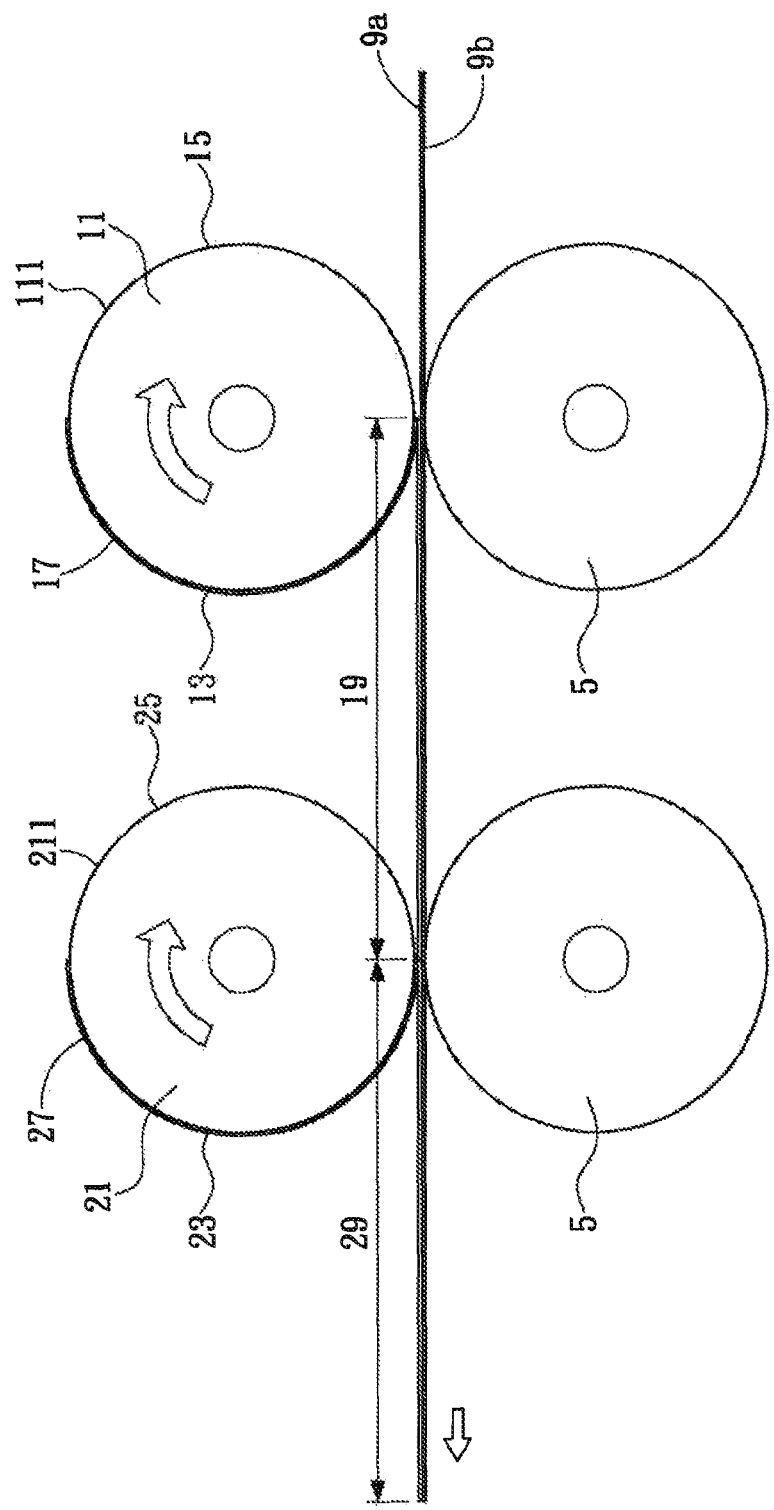
FIG. 3B is a schematic front view (1) after heat sealing of the first embodiment of the present invention.
Figure 3C:
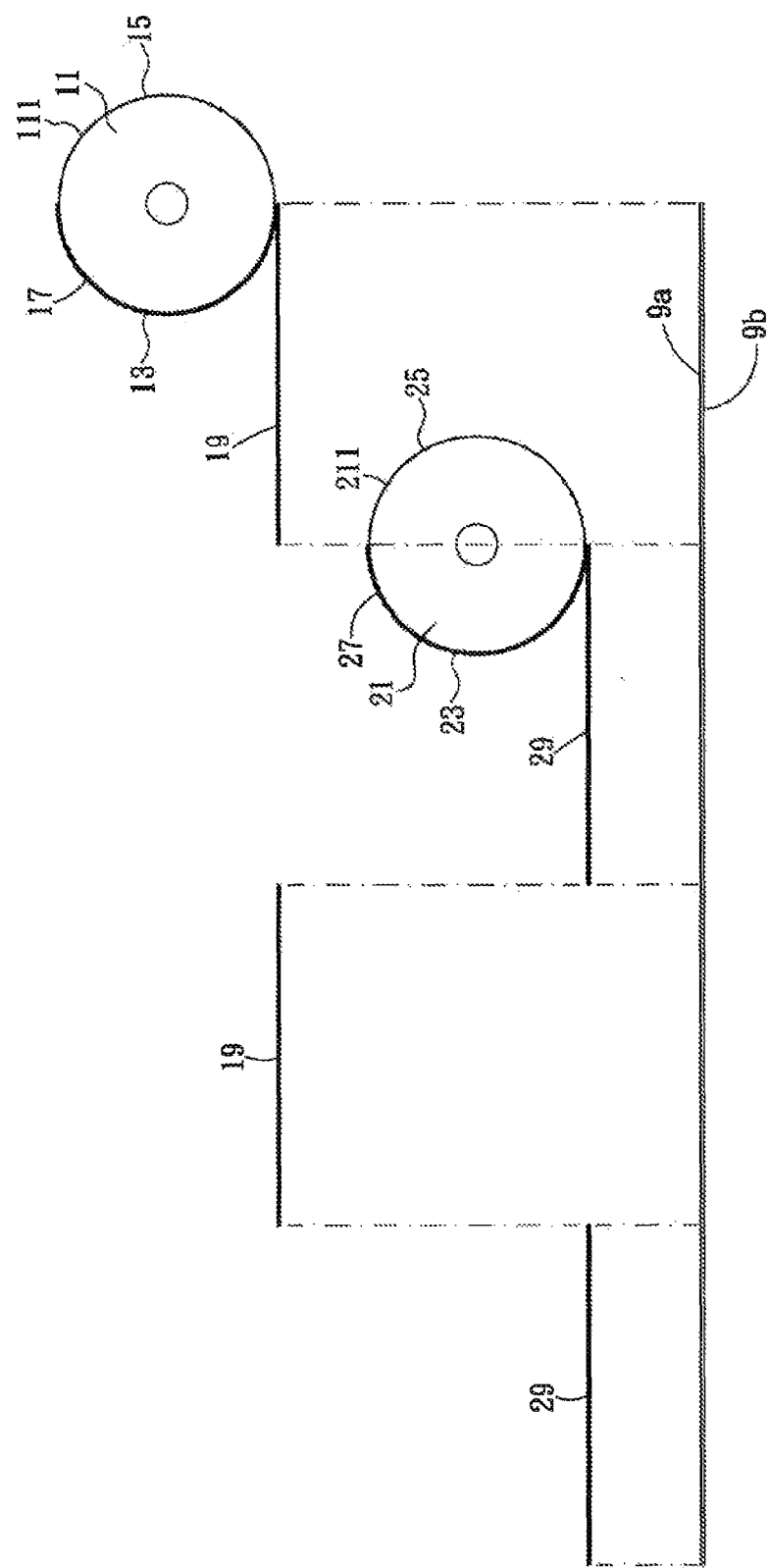
FIG. 3C is a schematic front view of a bonding segment of the first embodiment of the present invention.

Please refer to FIG. 3A, in which the first heating member 17 is an electrically heated wire herein, and is a packaging manner of a welding technology. However, in some embodiments, a gluing technology may be used as the packaging manner, such as: glue water added with a curing agent, and, the first heating member 17 is attached to the first heat sealing segment 13. When the first roller 11 rotates, the first heating member 17 bonds the plurality of film sheets 9a and 9b in a heat sealing manner to form a first bonding segment 19 (as shown in FIG. 3B and FIG. 3C), namely, the length of the first heating member 17 is equal to the length of the first bonding segment 19.

Please refer to FIG. 3A, in which the outer ring of the second roller 21 has a second circumference 211. In this embodiment, the second circumference 211 and the first circumference 111 have an equal length, where, the second circumference 211 includes a second heat sealing segment 23 and a second non-heat sealing segment 25. Herein, a second heat sealing segment 23 and a second non-heat sealing segment 25 are disposed on the second circumference 211, the length of the first heat sealing segment 13 and the second heat sealing segment 23 is greater than or equal to the first circumference 111, and when the plurality of film sheets 9a and 9b passes through the first roller 11 to the second roller 21, the first bonding segment 19 and a second bonding segment 29 on the plurality of film sheets 9a and 9b are connected (as shown in FIG. 3B and FIG. 3C). As shown in FIG. 3C, FIG. 3C is a schematic view where two ends of the first bonding segment 19 formed by the first roller 11 are respectively corresponding to two second bonding segments 29 formed by the second roller 21. Herein, the cross section of the second heat sealing segment 23 is formed into a semi-circular arc shape, located at one half of the second circumference 211, the cross section of the second non-heat sealing segment 25 is formed into a semi-circular arc shape, located at the other half of the second circumference 211, and the second heat sealing segment 23 and the second non-heat sealing segment 25 are arranged in a staggered manner (namely, the second heat sealing segment 23 is followed by the second non-heat sealing segment 25 and the second heat sealing segment 23 and the second non-heat sealing segment 25 are alternately arranged).

The length of and the number of the second heat sealing segment 23 and the second non-heat sealing segment 25 illustrated above are only exemplary, and the present invention is not limited thereto. In some embodiments, the length of the second heat sealing segment 23 and the length of the second non-heat sealing segment 25 may be the same (as shown in FIG. 3A). In some embodiments, two second heat sealing segments 23 and two second non-heat sealing segments 25 may be separately disposed on the second roller 21 (as shown in FIG. 5), and the two second heat sealing segments 23 and the two second non-heat sealing segments 25 are arranged on the second roller 21 in a staggered manner. Furthermore, in some embodiments, three second heat sealing segments 23 and three second non-heat sealing segments 25 may be separately disposed on the second roller 21 (as shown in FIG. 6), and the three second heat sealing segments 23 and the three second non-heat sealing segments 25 are arranged on the second roller 21 in a staggered manner, and are each located on one sixth of the outer edge.

In some embodiments, the first heat sealing segment 13 of the first roller 11 may be one in number, and is correspondingly disposed with a first heating member 17, and accordingly, a plurality of second heat sealing segments 23 of the second roller 21 is correspondingly disposed with a plurality of second heating members 27; or the first heat sealing segment 13 of the first roller 11 may be multiple in number, and is correspondingly disposed with a plurality of first heating members 17, and accordingly, a second heat sealing segment 23 (not shown), of the second roller 21 is correspondingly disposed with a second heating member 27.

Figure 7:
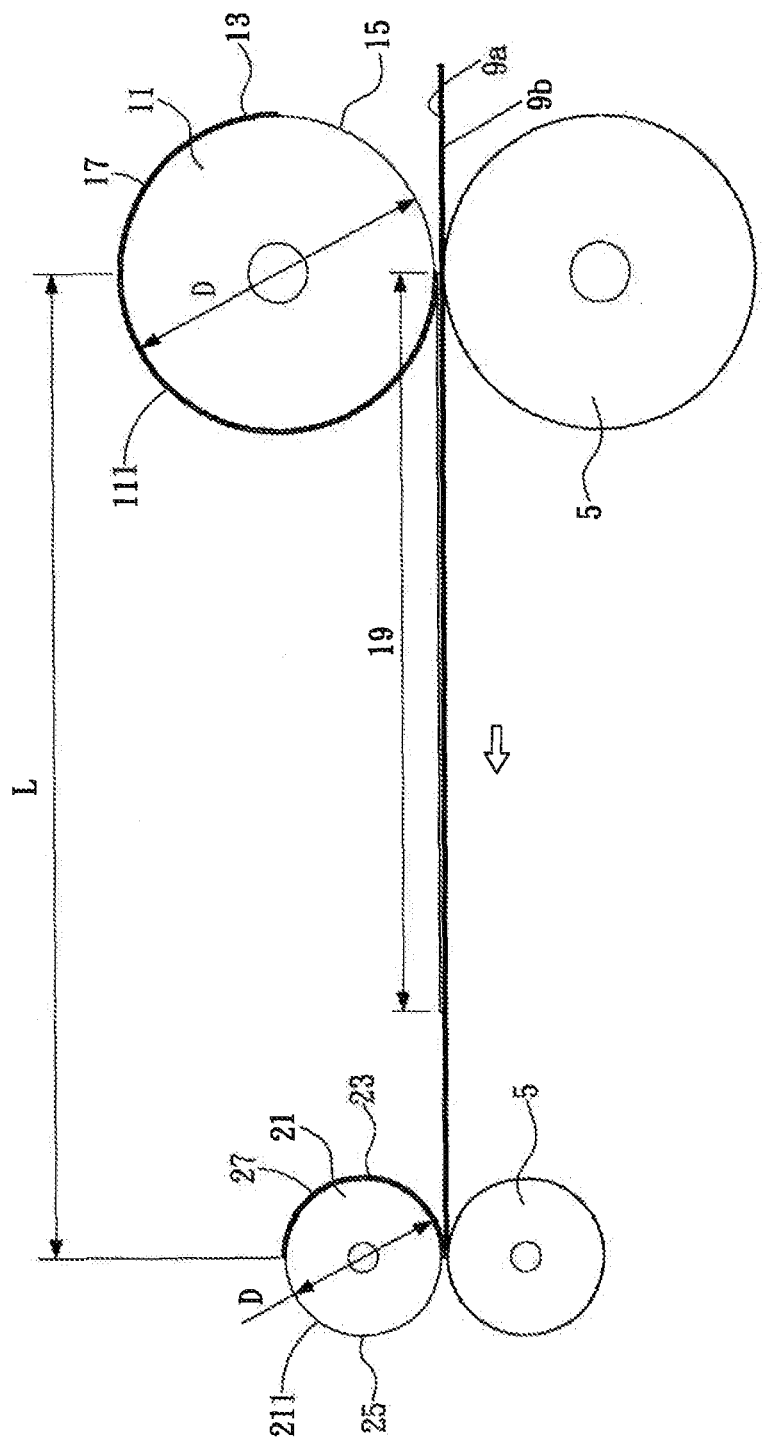
FIG. 7 is a schematic front view (1) of circumferences having unequal lengths of the first embodiment of the present invention.
Figure 8:
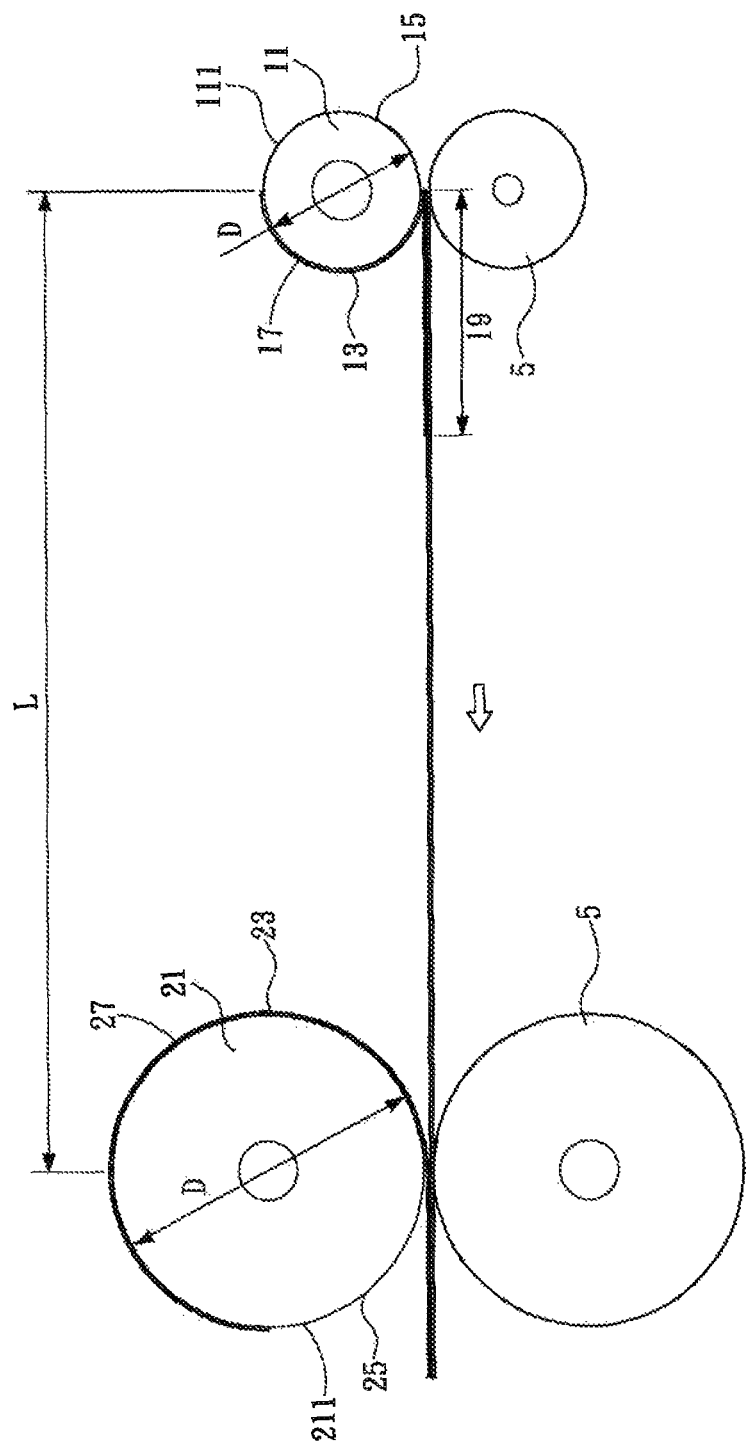
FIG. 8 is a schematic front view (2) of circumferences having unequal lengths of the first embodiment of the present invention.

The aforementioned illustration that the length of the first circumference 111 of the first roller 11 and the length of the second circumference 211 of the second roller 21 are equal is only exemplary, and the present invention is not limited thereto. In some embodiments, the length of the second circumference 211 may be less than the length of the first circumference 111 (as shown in FIG. 7), or the length of the second circumference 211 may be greater than the length of the first circumference 111 (as shown in FIG. 8).

Please refer to FIG. 3A, in which the second heating member 27 is an electrically heated wire herein, and is a packaging manner of a welding technology. However, in some embodiments, a gluing technology may be used as the packaging manner, such as: glue water added with a curing agent, and, the second heating member 27 is attached to the second heat sealing segment 23. In this embodiment, the first heating member 17 disposed on the first roller 11 and the second heating member 27 disposed on the second roller 21 are formed into semi-circular arcs in opposite directions. When the second roller 21 rotates, the first heating member 17 bonds the plurality of film sheets 9a and 9b in a heat sealing manner to form the second bonding segment 29, namely, the length of the second heating member 27 is equal to the length of the second bonding segment 29. Herein, the first bonding segment 19 and the second bonding segment 29 are connected so as to form an uninterrupted and continuous heat sealed seam 92 on the plurality of film sheets 9a and 9b (namely, two ends of the first bonding segment 19 are respectively connected to two second bonding segments 29), and in some embodiments, the connection portion of the first bonding segment 19 and the connection portion of the second bonding segment 29 may overlap.

Figure 4A:
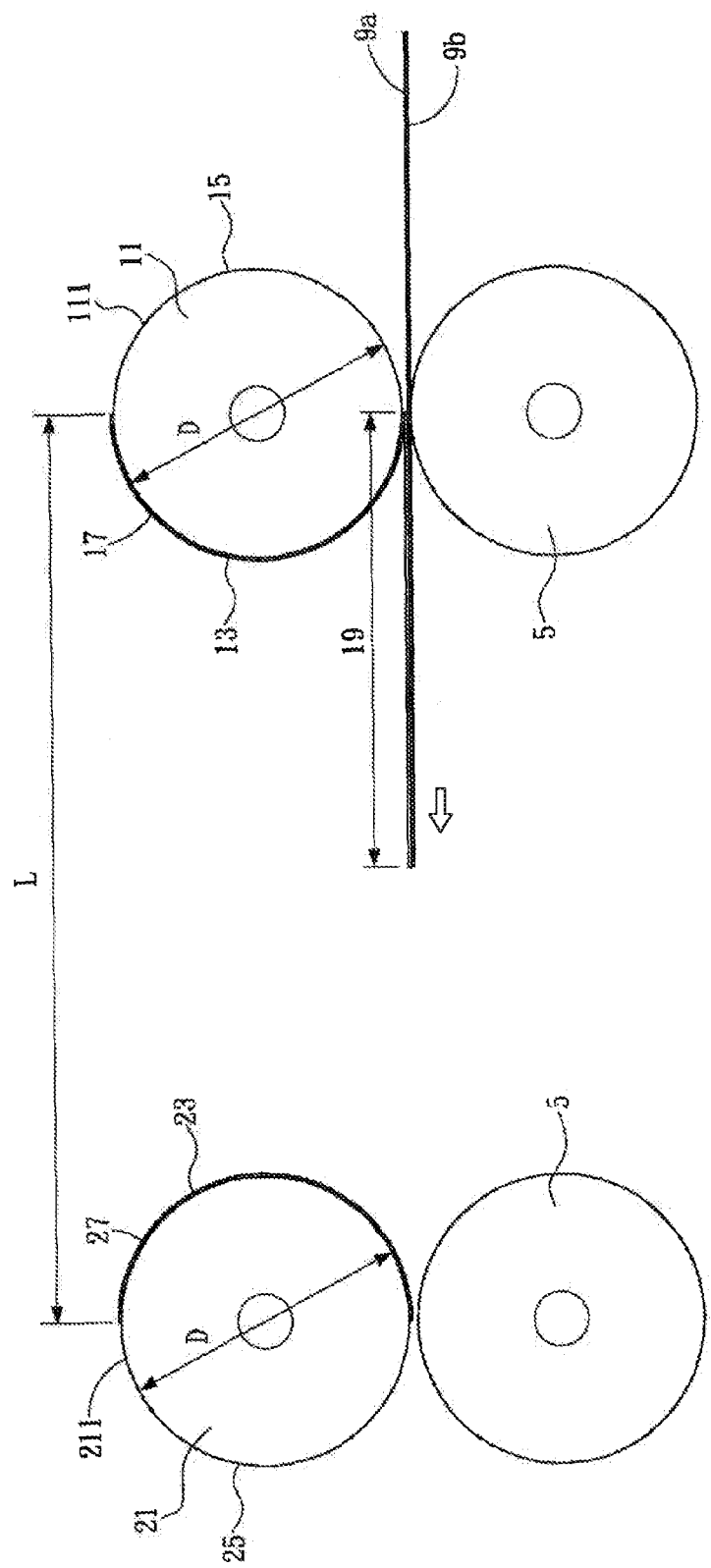
FIG. 4A is a schematic front view (2) before heat sealing of the first embodiment of the present invention.

The aforementioned arrangement aspect of the first heating member 17 on the first roller 11 and the second heating member 27 on the second roller 21 is only exemplary. In some embodiments, the first heating member 17 disposed on the first roller 11 and the second heating member 27 disposed on the second roller 21 may be formed into semi-circular arcs in opposite directions (as shown in FIG. 4A and FIG. 4B).

Figure 9:
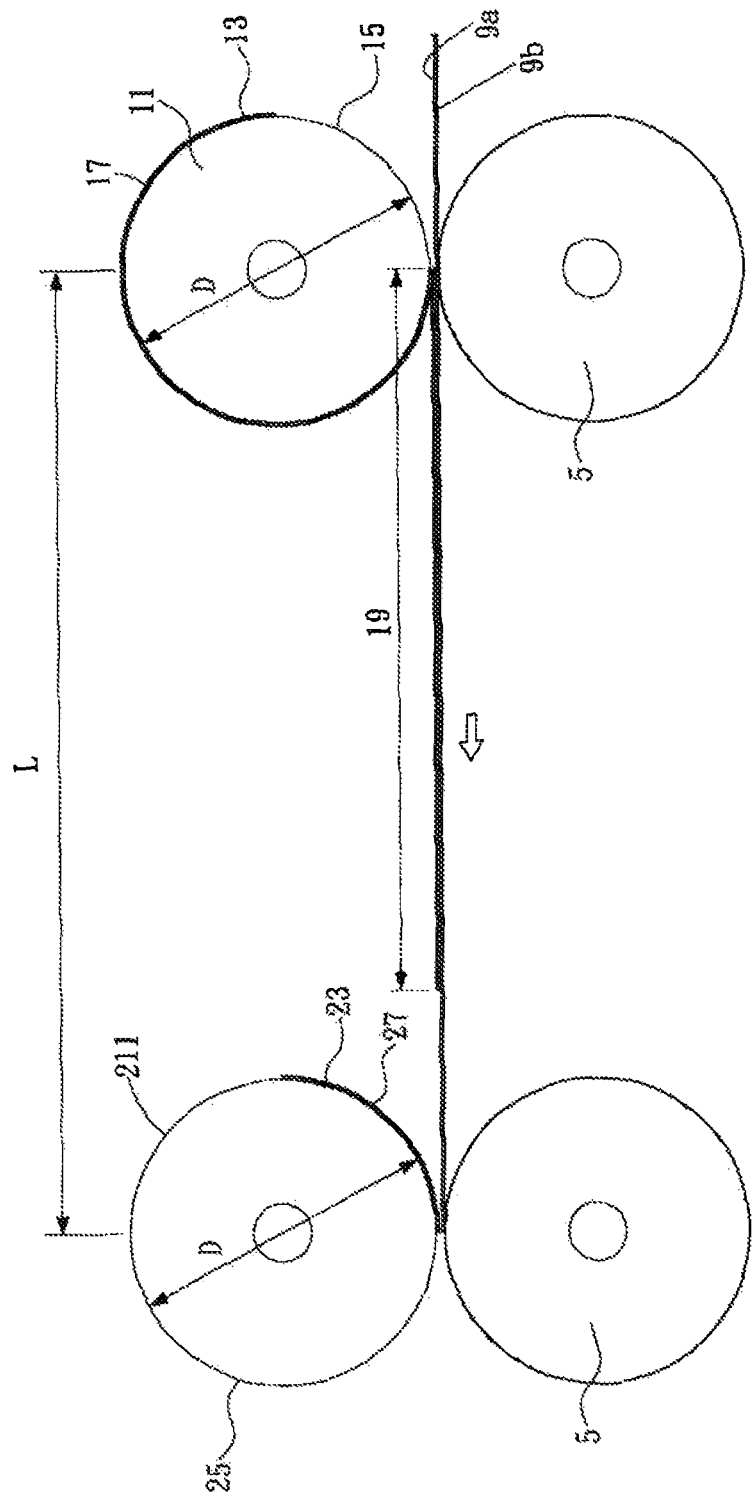
FIG. 9 is a schematic front view (3) of circumferences having unequal lengths of the first embodiment of the present invention.

Please refer to FIG. 3A, in which a pitch L exists between the first roller 11 and the second roller 21 of the present invention. Herein, because if the first heat sealing segment 13 and the second heat sealing segment 23 have an equal length, the pitch L is less than or equal to the length of the first heat sealing segment 13, or the pitch L is less than or equal to the length of the second heat sealing segment 23, and in this embodiment, the pitch L is equal to ½ of circular constant (π)*diameter (D) of the first roller 11 or the second roller 21. Furthermore, in some embodiments, if the length of the first circumference 111 and the length of the second circumference 211 are equal (namely, diameters D thereof are the same), the length of the first heat sealing segment 13 and the length of the second heat sealing segment 23 may be designed to be unequal (as shown in FIG. 9), and the pitch L between the first roller 11 and the second roller 21 is less than or equal to the length of the first heat sealing segment 13 and the second heat sealing segment 23. Furthermore, in some embodiments, the length of the first circumference 111 and the length of the second circumference 211 may be designed to be unequal (namely, diameters D thereof are not the same), and the pitch L between the first roller 11 and the second roller 21 is less than or equal to the length of the first heat sealing segment 13 and the second heat sealing segment 23 (as shown in FIG. 7 and FIG. 8).

Please refer to FIG. 3A, in which the continuous sealing device 1 of the present invention further includes a jig wheel 5, located between the first roller 11 and the second roller 21. When heat sealing is performed on the plurality of film sheets 9a and 9b, one end of the plurality of film sheets 9a and 9b is input to a place between the jig wheel 5 and the first roller 11, the first heating member 17 on the first roller 11 rotates and heat sealing is performed on the plurality of film sheets 9a and 9b; after that, one end of the plurality of film sheets 9a and 9b is input to a place between the jig wheel 5 and the second roller 21, the second heating member 27 on the second roller 21 rotates and heat sealing is performed on the plurality of film sheets 9a and 9b. In some embodiments, the jig wheel 5 is made of rubber or plastic or other hard materials, and herein, the cross section of the jig wheel 5 is a rounded body.

The aforementioned illustration about that the jig wheel 5 is a rounded body is only exemplary. In some embodiments, the cross section of the jig wheel 5 may be of a gear shape or a half roundness and half gear shape. Since the jig wheel 5 in a gear shape may clamp the plurality of film sheets 9a and 9b in a crossed manner at the time of conveying the plurality of film sheets 9a and 9b, when the plurality of film sheets 9a and 9b is transiently moved, the sealing effects that the air is sealed and before the plurality of film sheets 9a and 9b is moved in to be bonded in a heat sealing manner, the sealing place of the plurality of film sheets 9a and 9b is not inflated, so as to provide convenience for bonding in a heat sealing manner are provided.

Please refer to FIG. 2C, in which the continuous sealing device 1 of the present invention further includes an inflating module 7. Herein, the inflating module 7 is located in front of the first roller 11. Before the plurality of film sheets 9a and 9b is input to the first roller 11, the plurality of film sheets 9a and 9b passes through the inflating module 7, the inflating module 7 blows air to an inflating mouth between the plurality of film sheets 9a and 9b, and the air enters a place between the plurality of film sheets 9a and 9b. Herein, air is injected to an air storage chamber 91a of an air column 91 so that the plurality of film sheets 9a and 9b expands to two outer sides, the tapering effect of the air storage chamber 91a in a funnel shape prevents air from being exposed, and the plurality of film sheets 9a and 9b continuously moves and is subjected to heat sealing of the first roller 11 and the second roller 21 to form the air column 91.

Figure 10A:
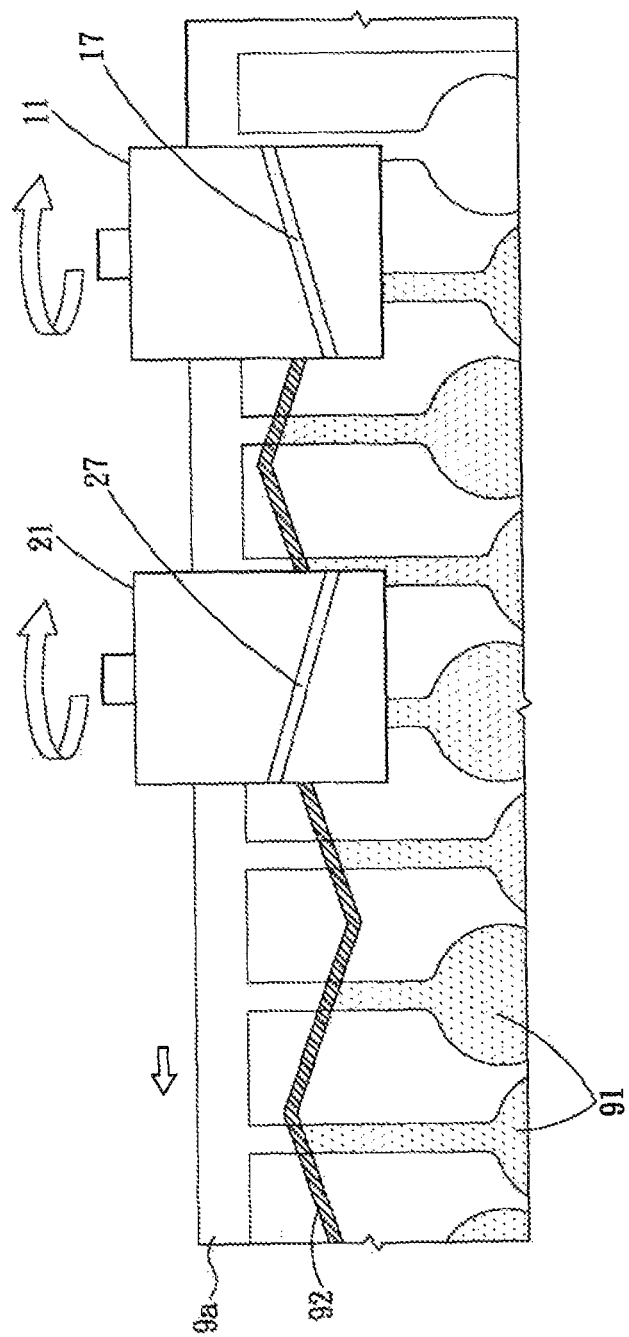
FIG. 10A is a schematic top view (1) of a second embodiment of the present invention.
Figure 10B:
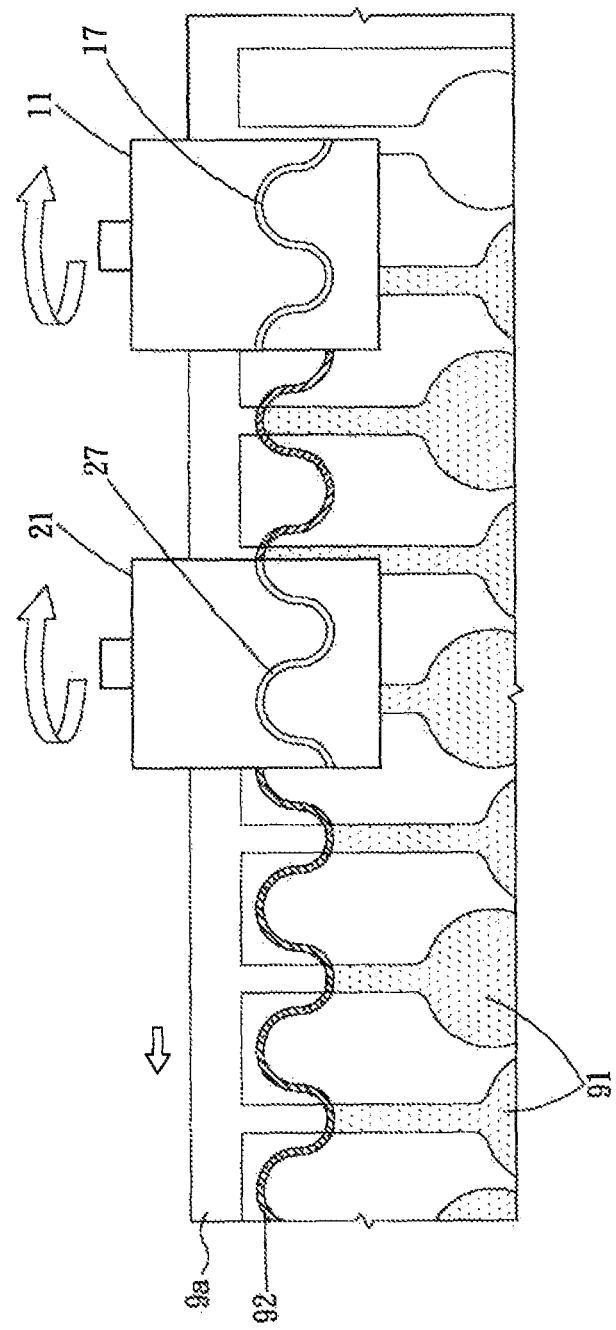
FIG. 10B is a schematic top view (2) of the second embodiment of the present invention.

Please refer to FIG. 10A and FIG. 10B, in which a second embodiment of the present invention is shown. the maximum difference between this second embodiment and the first embodiment lies in that: the first heat sealing segment 13 of this embodiment is in a slant straight line shape at the outer ring of the first roller 11 (as shown in FIG. 10A), and the second heat sealing segment 23 is in a slant straight line shape at the outer ring of the second roller 21. After the plurality of film sheets 9a and 9b is subjected to heat sealing, the heat sealed seam 92 on the plurality of film sheets 9a and 9b is formed into a shape of being alternately connected high and low. Furthermore, in some embodiments, the first heat sealing segment 13 is in a wave circular arc at the outer ring of the first roller 11 (as shown in FIG. 10B), and the second heat sealing segment 23 is in a wave circular arc shape at the outer ring of the second roller 21. After the plurality of film sheets 9a and 9b is subjected to heat sealing, the heat sealed seam 92 on the plurality of film sheets 9a and 9b is formed into a shape of being alternately connected high and low.

Figure 11:
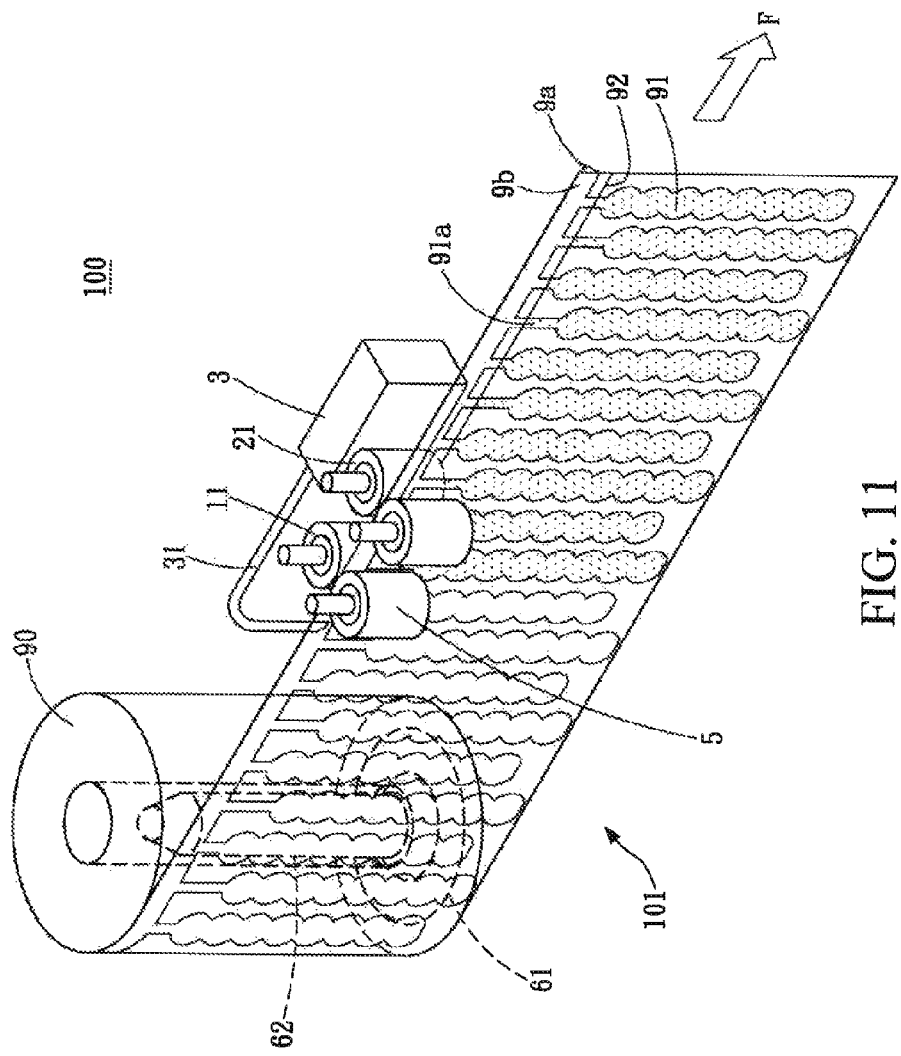
FIG. 11 is a schematic external view (1) of a third embodiment of the present invention.
Figure 12:
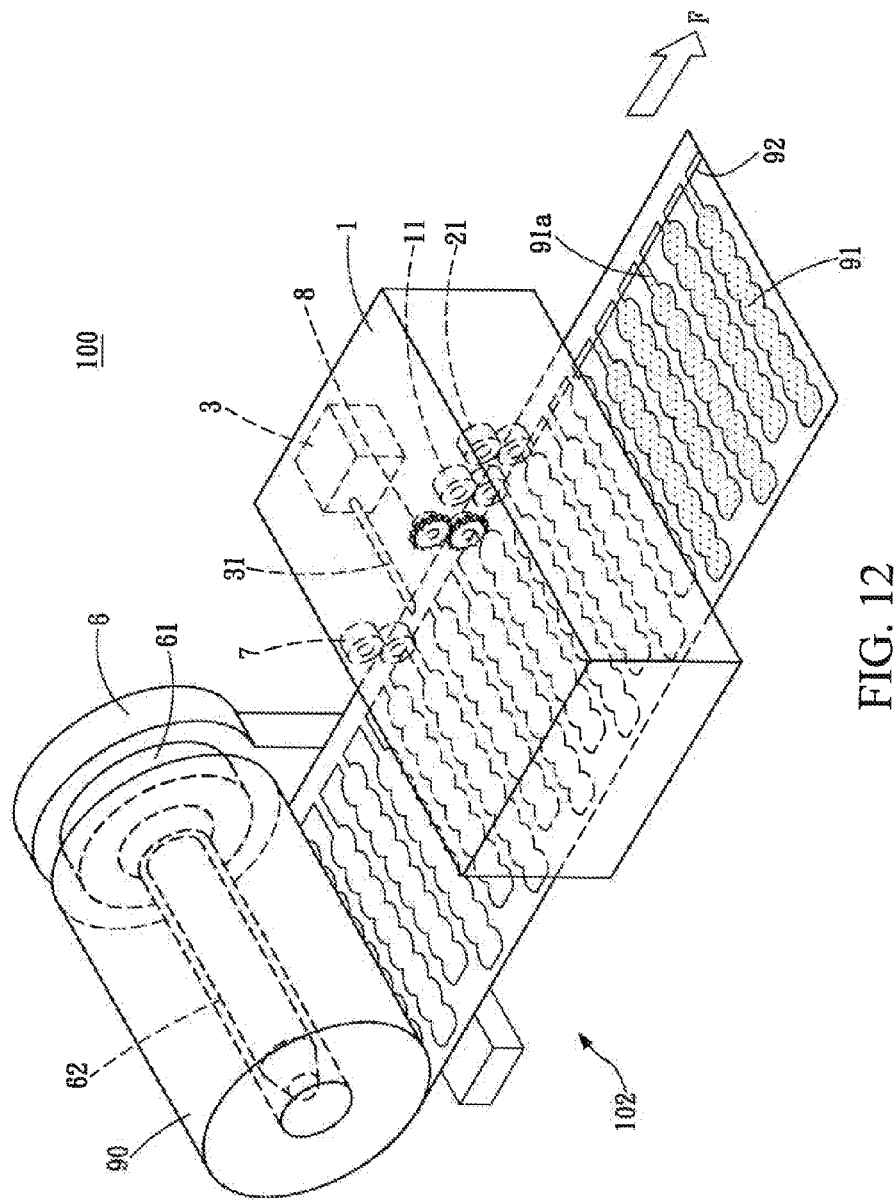
FIG. 12 is a schematic external view (2) of the third embodiment of the present invention.
Figure 13:
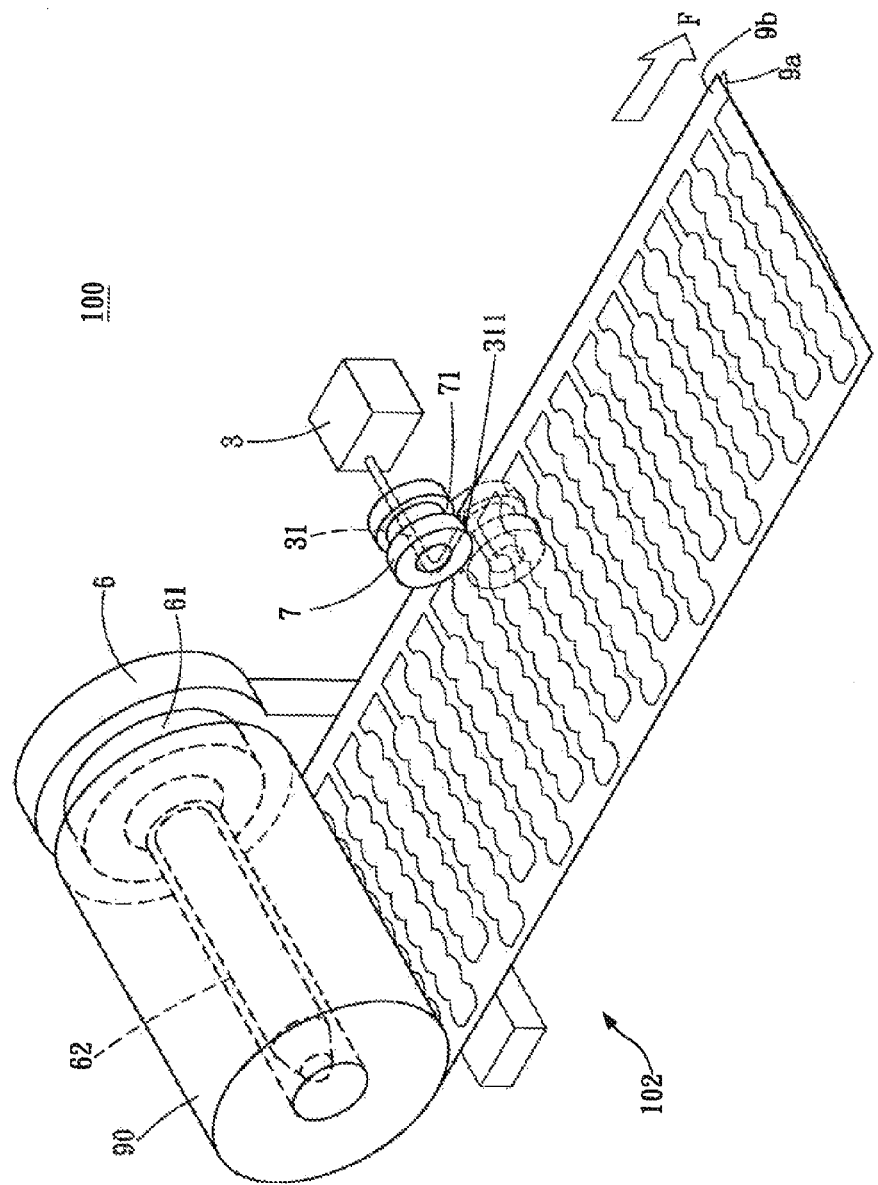
FIG. 13 is a schematic external view (3) of the third embodiment of the present invention.

Please refer to FIG. 11, FIG. 12, and FIG. 13, in which a third embodiment of the present invention is shown. This third embodiment discloses a storing and feeding table 100, for conveying the plurality of film sheets 9a and 9b, and the storing and feeding table 100 is disposed with the continuous sealing device 1 according to the first embodiment or the second embodiment. Herein, the storing and feeding table 100 includes an inflating module 3, providing an inflating source to the plurality of film sheets 9a and 9b to form the air column 91. After inflating is performed, the air column 91 advances toward the exit direction F (as shown in FIG. 11), and the inflating module 3 includes an inflating pipe 31. The cross section of the inflating pipe 31 is in a circular pipe model, for inflating between the plurality of film sheets 9a and 9b. In this embodiment, the inflating pipe 31 is placed at the upper end of the plurality of film sheets 9a and 9b and blows air toward the air storage chamber 91a of the air column 91.

Please refer to FIG. 12, in which in some embodiments, the storing and feeding table 100 includes a rotating and feeding wheel base 6, disposed with a rotary drum roll material 90 (namely, formed by winding the plurality of film sheets 9a and 9b), and the rotating and feeding wheel base 6 includes a rotary disk 61, and a latch 62. Herein, the rotary disk 61 rotates the rotary drum roll material 90 and conveys the plurality of film sheets 9a and 9b into the continuous sealing device 1 and the inflating module 3, and the latch 62 is located at the rotary disk 61, and is provided to penetrate the rotary drum roll material 90. In this embodiment, the storing and feeding table 100 may be applied to a vertical type rolling platform 101 (namely, the rotary drum roll material 90 is in an erect form).

The aforementioned illustration about that the storing and feeding table 100 is applied to a vertical type rolling platform 101 is only exemplary. In some embodiments, the storing and feeding table 100 may be applied to a horizontal type rolling platform 102 (namely, the rotary drum roll material 90 is in a horizontally lying form), as shown in FIG. 12.

Please refer to FIG. 12, in which in some embodiments, the storing and feeding table 100 further includes a plurality of pressing wheels 7, and a plurality of gear type pressing rollers 8, and the plurality of film sheets 9a and 9b is located between the plurality of pressing wheels 7. Herein, the pressing wheel 7 includes a concave ring 71 (as shown in FIG. 13), the head end 311 of the inflating pipe 31 is located at the concave ring 71, and the inflating pipe 31 is placed in the pressing wheel 7. After the inflating pipe 31 inflates, in order to prevent the air overflow caused when the plurality of film sheets 9a and 9b is not sealed at the continuous sealing device 1, the position of the head end 311 of the inflating pipe 31 is controlled in the pressing wheel 7, so that the pressing wheel 7 covers the inflating pipe 31. Herein, the storing and feeding table 100 further includes a plurality of gear type pressing rollers 8 (as shown in FIG. 12), and the plurality of film sheets 9a and 9b is located between the plurality of gear type pressing rollers 8, so a crossed fluctuating rolling manner may be formed through the plurality of gear type pressing rollers 8, the plurality of film sheets 9a and 9b is introduced to the continuous sealing device 1 in a pressing manner to perform a sealing procedure of bonding in a heat sealing manner.

In the present invention, the first roller and the second roller rotate to perform heat sealing on the plurality of film sheets, so that the first heating member of the first roller bonds the plurality of film sheets in a heat sealing manner to form the first bonding segment, and the second heating member of the second roller bonds the plurality of film sheets in a heat sealing manner to form the second bonding segment; therefore, the first bonding segment and the second bonding segment are connected to form an uninterrupted heat sealed seam on the plurality of film sheets, so as to effectively solve the problem in the prior art that a plurality of heat sealed seams on a plurality of film sheets cannot be connected and discontinue, thereby causing leakage of inflation air in the air column.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A continuous sealing device, used for performing heat sealing on a plurality of film sheets, wherein the continuous sealing device comprises:
 a first roller, having a first circumference, wherein the first circumference comprises at least one first heat sealing segment and at least one first non-heat sealing segment;
 at least one first heating member, located at the at least one first heat sealing segment, wherein when the first roller rotates, the at least one first heating member bonds the film sheets in a heat sealing manner to form a first bonding segment;
 a second roller, having a second circumference, wherein the second circumference and the first circumference have an equal length, the second circumference comprises at least one second heat sealing segment and at least one second non-heat sealing segment, and the length of the at least one first heat sealing segment and the at least one second heat sealing segment is greater than or equal to the first circumference; and
 at least one second heating member, located at the at least one second heat sealing segment, wherein when the second roller rotates, the at least one second heating member bonds the film sheets in a heat sealing manner to form a second bonding segment, and the first bonding segment and the second bonding segment are connected to form an uninterrupted heat sealed seam on the film sheets;
 wherein the first roller and the second roller are disposed at the same side of the plurality of film sheets; and
 wherein a pitch exists between the first roller and the second roller, and the pitch is less than or equal to the length of the at least one first heat sealing segment and the at least one second heat sealing segment.

2. The continuous sealing device according to claim 1, wherein the at least one first heat sealing segment and the at least one first non-heat sealing segment are arranged in a staggered manner, and the at least one second heat sealing segment and the at least one second non-heat sealing segment are arranged in a staggered manner.

3. A storing and feeding table, for conveying a plurality of film sheets, wherein the storing and feeding table comprises:
 a continuous sealing device according to claim 1, wherein the film sheets form an air column; and
 an inflating module, for inflating air toward an air storage chamber of the air column.

4. The storing and feeding table according to claim 3, further comprising: a rotating and feeding wheel base, disposed with a rotary drum roll material of the film sheets, wherein the rotating and feeding wheel base comprises:
 a rotary disk, for rotating the rotary drum roll material and conveying the film sheets into the continuous sealing device and the inflating module; and
 a latch, located at the rotary disk.

5. The storing and feeding table according to claim 3, further comprising: a plurality of pressing wheels, wherein the film sheets are located between the pressing wheels.

6. The storing and feeding table according to claim 5, wherein the pressing wheels comprise a plurality of concave rings, and the inflating module comprises an inflating pipe located at the concave rings.

7. The storing and feeding table according to claim 3, further comprising: a plurality of gear type pressing rollers, wherein the film sheets are located between the gear type pressing rollers.

8. The storing and feeding table according to claim 3, further comprising: a jig wheel located between the first roller and the second roller.

9. A continuous sealing device, used for performing heat sealing on a plurality of film sheets, wherein the continuous sealing device comprises:
a first roller, having a first circumference, wherein the first circumference comprises at least one first heat sealing segment and at least one first non-heat sealing segment;
at least one first heating member, located at the at least one first heat sealing segment, wherein when the first roller rotates, the at least one first heating member bonds the film sheets in a heat sealing manner to form a first bonding segment;
a second roller, having a second circumference, wherein the length of the second circumference is less than the length of the first circumference, the second circumference comprises at least one second heat sealing segment and at least one second non-heat sealing segment, and the length of the at least one first heat sealing segment and the at least one second heat sealing segment is greater than or equal to the first circumference; and
at least one second heating member, located at the at least one second heat sealing segment, wherein when the second roller rotates, the at least one second heating member bonds the film sheets in a heat sealing manner to form a second bonding segment, and the first bonding segment and the second bonding segment are connected to form an uninterrupted heat sealed seam on the film sheets;
wherein the first roller and the second roller are disposed at the same side of any one of the plurality of film sheets; and
wherein a pitch exists between the first roller and the second roller, and the pitch is less than or equal to the length of the at least one first heat sealing segment, or the pitch is less than or equal to the length of the at least one second heat sealing segment.

10. The continuous sealing device according to claim 9, wherein the at least one first heat sealing segment and the at least one first non-heat sealing segment are arranged in a staggered manner, and the at least one second heat sealing segment and the at least one second non-heat sealing segment are arranged in a staggered manner.

* * * * *